(12) United States Patent
Li et al.

(10) Patent No.: US 12,392,602 B1
(45) Date of Patent: Aug. 19, 2025

(54) LITTROW GRATING INTERFEROMETRY DEVICE AND USE THEREOF

(71) Applicant: CHANGCHUN INSTITUTE OF OPTICS, FINE MECHANICS AND PHYSICS, CHINESE ACADEMY OF SCIENCES, Changchun (CN)

(72) Inventors: Wenhao Li, Changchun (CN); Wenyuan Zhou, Changchun (CN); Zhaowu Liu, Changchun (CN); Yujia Sun, Changchun (CN); Lin Liu, Changchun (CN)

(73) Assignee: CHANGCHUN INSTITUTE OF OPTICS, FINE MECHANICS AND PHYSICS, CHINESE ACADEMY OF SCIENCES, Jilin (CN)

( * ) Notice: Subject to any disclaimer, the term of this patent is extended or adjusted under 35 U.S.C. 154(b) by 0 days.

(21) Appl. No.: 19/050,210

(22) Filed: Feb. 11, 2025

(30) Foreign Application Priority Data

Aug. 5, 2024 (CN) .......................... 202411063882.6

(51) Int. Cl.
*G01B 11/14* (2006.01)
*G01B 9/02001* (2022.01)
*G01B 9/02015* (2022.01)

(52) U.S. Cl.
CPC .......... *G01B 11/14* (2013.01); *G01B 9/02007* (2013.01); *G01B 9/02015* (2013.01); *G01B 2290/70* (2013.01)

(58) Field of Classification Search
CPC .......... G01D 5/38; G01D 5/266; G01D 5/344; G01D 5/347; G01B 2290/70; G01B 9/02;
(Continued)

(56) References Cited

U.S. PATENT DOCUMENTS

| 4,334,778 A * | 6/1982 | Pardue | G01B 9/02002 356/486 |
| 6,687,007 B1 * | 2/2004 | Meigs | G01J 3/0205 356/456 |

(Continued)

FOREIGN PATENT DOCUMENTS

| CN | 105823422 A | 8/2016 |
| CN | 115824061 A | 3/2023 |

(Continued)

*Primary Examiner* — Gordon J Stock, Jr.
(74) *Attorney, Agent, or Firm* — Nitin Kaushik

(57) ABSTRACT

The invention relates to the technical field of grating interferometry, in particular to a Littrow grating interferometry device and a use thereof. The device comprises: a two-frequency orthogonal polarization light source, a polarizing beam splitting prism, a reflection assembly, a detector, and a first diffraction grating and a second diffraction grating having identical parameters. The output light of the two-frequency orthogonal polarization light source is split by the polarizing beam splitting prism into horizontally polarizing measuring light which is transmitted and vertically polarizing measuring light which is reflected. The two beams of measuring light undergo diffraction twice between the first diffraction grating and the second diffraction grating, and finally the two beams of measuring light interfere with each other and are incident on the detector. Grating displacement is calculated according to the interference pattern. The invention achieves secondary diffraction under Littrow incidence, and improves the precision of displacement measurement.

7 Claims, 1 Drawing Sheet

(58) Field of Classification Search
CPC .......... G01B 9/02015; G01B 9/02016; G01B 9/02002; G01B 9/02007; G01B 9/02003; G01B 9/02021; G01B 9/02017; G01B 9/02019; G01B 11/14; G01B 11/161; G01B 11/2441
See application file for complete search history.

(56) References Cited

U.S. PATENT DOCUMENTS

| | | | |
|---|---|---|---|
| 7,440,113 B2 * | 10/2008 | Trutna, Jr. ............... | G01D 5/38 250/237 G |
| 7,525,665 B2 * | 4/2009 | Lee ................... | G01B 9/02019 356/493 |
| 7,864,336 B2 * | 1/2011 | Prince ................. | G01D 5/38 356/499 |
| 9,141,003 B2 * | 9/2015 | Beerens .............. | G03F 7/70766 |
| 12,241,739 B1 * | 3/2025 | Li ...................... | G01B 9/02045 |

FOREIGN PATENT DOCUMENTS

| | | | |
|---|---|---|---|
| CN | 117091513 A | | 11/2023 |
| CN | 117948897 A | * | 4/2024 |
| CN | 118242972 A | * | 6/2024 |

\* cited by examiner

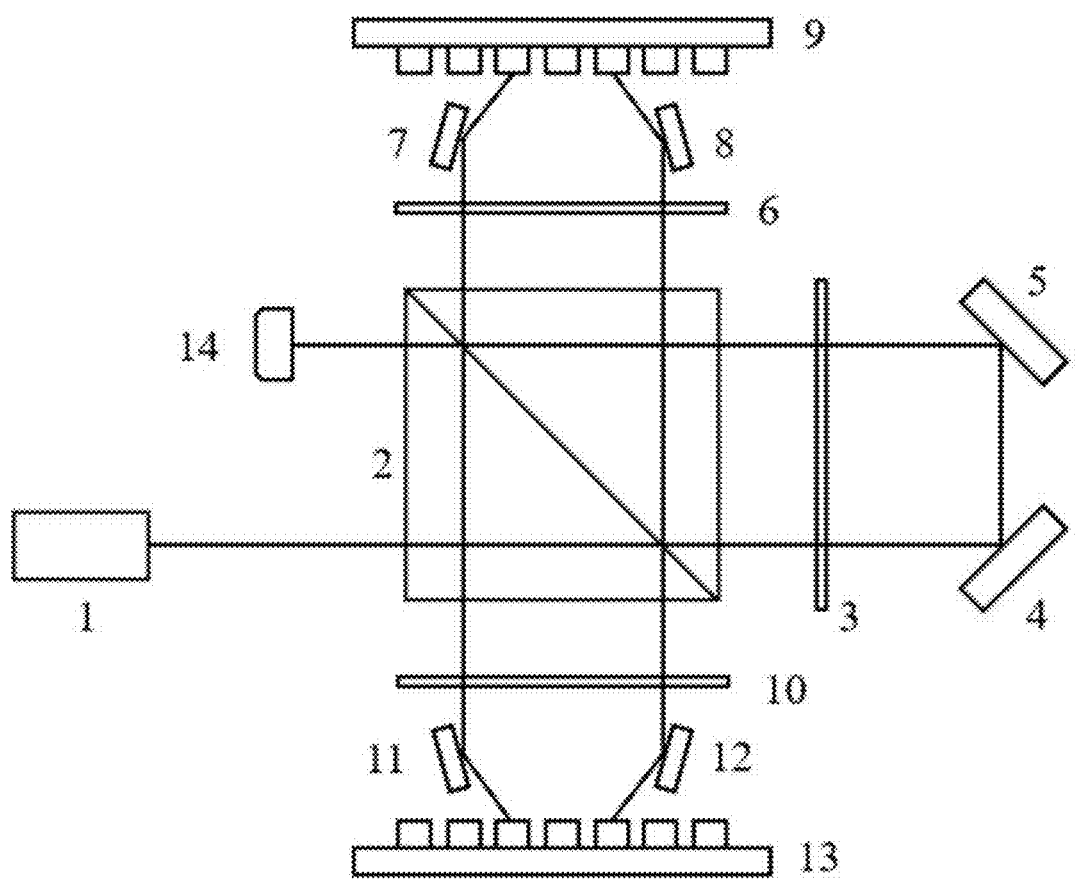

LITTROW GRATING INTERFEROMETRY DEVICE AND USE THEREOF

CROSS-REFERENCE TO RELATED APPLICATIONS

The application claims priority to Chinese patent application No. 2024110638826, filed on Aug. 5, 2024, the entire contents of which are incorporated herein by reference.

TECHNICAL FIELD

The present invention relates to the technical field of grating interferometry, in particular to a Littrow grating interferometry device and a use thereof.

BACKGROUND

At present, high-precision displacement measurement techniques mainly include laser interferometry and grating interferometry. The measuring basis of laser interferometry is laser wavelength. Laser interferometry has the disadvantage of being relatively sensitive to the refractive index of air and requiring strict external environmental conditions. It is easy to obtain high-precision measurement results for a short measurement travel. However, as the measurement travel gradually increases, tiny changes in measurement environments such as temperature, humidity, and air pressure will severely affect the accuracy of the measurement results. The measurement error for a meter-sized measurement travel can even be as high as several hundred nanometers. Therefore, a high-level environmental control system is required in order to achieve high-precision measurement using a laser interferometer. The measuring basis of grating interferometry is grating pitch. The grating substrate can be made of a zero expansion material. In contrast to wavelength, grating grooves are minimally influenced by external environments. The measurement precision of grating interferometry is hardly affected as the measurement travel increases. Strict environmental controls such as constant temperature, constant pressure, constant humidity, etc. are not required, which greatly reduces the requirement of a measurement system for the environments. Given the above advantages, the application of grating interference-based displacement measuring devices in fields such as high-end computer numerical control machine tools and aeronautics and astronautics is urgently required.

Presently, the incident optical path of a grating interferometer can be classified into vertical incident optical path and Littrow incident optical path. Compared with vertical incidence, the Littrow incidence optical path allows the use of a grating having a higher reticle density, which has important significance for improving measurement resolution and measurement precision. However, it is difficult for the conventional Littrow incident optical path to achieve multiple diffractions. Moreover, Littrow optical path is very sensitive to the precise alignment and posture of the grating, and any tiny angular change or posture deviation of the grating can lead to a change in diffraction efficiency and influence the direction and intensity of diffracted light, thus influencing the measurement precision.

SUMMARY

In order to solve the above problems, provided in the present invention is a Littrow grating interferometry device and a use thereof. The Littrow grating interferometry device uses two diffraction gratings, which are positioned opposite to each other and fixed. A particular structure of optical paths is configured such that the output light of a two-frequency orthogonal polarization light source achieves secondary diffraction under Littrow incidence between the two diffraction gratings, which effectively solves the problem that the existing Littrow incident optical path cannot achieve secondary diffraction. Optical subdivision at a higher multiple can be achieved using the device of the present invention.

Provided in the present invention is a Littrow grating interferometry device, comprising, a light source, a polarizing beam splitting prism, a reflection assembly, a detector, and a first diffraction grating and a second diffraction grating having identical parameters;

wherein, the output light of the light source is composed of first measuring light and second measuring light having different frequencies and mutually perpendicular polarization states, the first diffraction grating and the second diffraction grating are parallel to each other and are positioned to be opposite to each other on two sides of the polarizing beam splitting prism, and both the first diffraction grating and the second diffraction grating reflect diffracted light along an original incident optical path; of the other two sides of the polarizing beam splitting prism, the reflection assembly is disposed on one side, and the light source and the detector are disposed on the other side; a first quarter-wave plate is disposed between the reflection assembly and the polarizing beam splitting prism; a second quarter-wave plate is disposed between the first diffraction grating and the polarizing beam splitting prism; a third quarter-wave plate is disposed between the second diffraction grating and the polarizing beam splitting prism; and the polarizing beam splitting prism is used to separate the first measuring light and the second measuring light, such that the light in a horizontal polarization state is transmitted and the light in a vertical polarization state is reflected; the reflection assembly is used to reflect incident light to the detector.

Preferably, reflective mirrors used to reflect diffracted light, which is obtained after diffraction by the first diffraction grating, along the original incident optical path are disposed between the first diffraction grating and the second quarter-wave plate; and reflective mirrors used to reflect diffracted light, which is obtained after diffraction by the second diffraction grating, along the original incident optical path are disposed between the second diffraction grating and the third quarter-wave plate.

Preferably, the reflection assembly comprises two reflective mirrors which are angularly positioned perpendicular to each other.

A use of the Littrow grating interferometry device is provided. The use of the Littrow grating interferometry device in performing displacement measurement comprises the following steps:

acquiring the complex amplitudes of the first measuring light and the second measuring light in the output light of the light source;

acquiring the complex amplitudes of the first measuring light and the second measuring light collected by the detector; and obtaining the quantity of change in the phase of the first measuring light and the quantity of change in the phase of the second measuring light resulting from displacement of the first diffraction grating and the second diffraction grating by performing calculation based on a Doppler frequency shift effect produced by m-order diffracted light, and obtaining the displacement of the first diffraction grating and the second diffraction grating by performing calculation according to the difference between the quantity of change in the phase of the first measuring light and the quantity of change in the phase of the second measuring light.

Preferably, the complex amplitudes of the first measuring light and the second measuring light in the output light of the light source are expressed as:

$$E_{f_1} = E_0 \cdot e^{i(-2\pi f_1 \cdot t + \varphi_0)};$$

$$E_{f_2} = E_0 \cdot e^{i(-2\pi f_2 \cdot t + \varphi_0')};$$

where, $f_1$ represents the frequency of the first measuring light, $f_2$ represents the frequency of the second measuring light, $E_0$ represents the amplitude of the orthogonal linear polarized light of the first measuring light and the second measuring light, t represents time, $E_{f_1}$ represents the complex amplitude of the first measuring light as it radiates from the light source, $E_{f_2}$ represents the complex amplitude of the second measuring light as it radiates from the light source, $\varphi_0$ represents the phase of the first measuring light as it radiates from the light source, and $\varphi_0'$ represents the phase of the second measuring light as it radiates from the light source.

Preferably, the complex amplitudes of the first measuring light and the second measuring light collected by the detector are expressed as:

$$E'_{f_1} = E_0 \cdot e^{i(-2\pi f_1 \cdot t + \varphi_0 + 2\varphi_1)};$$

$$E'_{f_2} = E_0 \cdot e^{i(-2\pi f_2 \cdot t + \varphi_0' + 2\varphi_2)};$$

where, $E_{f_1}'$ represents the complex amplitude of the first measuring light collected by the detector, $E_{f_2}'$ represents the complex amplitude of the second measuring light collected by the detector, $\varphi_1$ represents the quantity of change in the phase of the first measuring light resulting from displacement, and $\varphi_2$ represents the quantity of change in the phase of the second measuring light resulting from displacement.

Preferably, the quantity of change in the phase of the first measuring light and the quantity of change in the phase of the second measuring light resulting from displacement obtained based on the Doppler frequency shift effect produced by m-order diffracted light are as follows:

$$\begin{cases} \varphi_1 = \dfrac{4\pi m \cdot S}{d} \\ \varphi_2 = -\dfrac{4\pi m \cdot S}{d} \end{cases};$$

where, m represents the mth-order diffracted light, d represents the distance between the first diffraction grating and the second diffraction grating, and S represents the displacement of the first diffraction grating and the second diffraction grating;

thus, the formula for calculating the displacement of the first diffraction grating and the second diffraction grating is as follows:

$$S = \dfrac{d \cdot (\varphi_1 - \varphi_2)}{8\pi m}.$$

Compared with the prior art, the present invention can achieve the following beneficial effects:

The present invention successfully achieves secondary diffraction under Littrow incidence by adopting two diffraction gratings positioned opposite to each other, and solves the problem that the existing Littrow optical path and grating interferometer can not achieve multiple diffractions. By virtue of an innovative design of the structure of optical paths, the present invention achieves optical subdivision at a higher multiple and enables significant increase in the precision of displacement measurement.

In addition, the present invention uses two diffraction gratings that are positioned fixed relative to each other, and the optical path length of the first measuring light is equal to that of the second measuring light. Even if the light paths in between the two diffraction gratings might be rotated, the light path of the first measuring light and that of the second measuring light would be rotated synchronously, and the respective influences of the rotation angle on the two optical path lengths would be complementary, which can achieve the effect of restraining the error in optical length. Furthermore, optical path rotation would not cause deviation of the positions of the two beams of measuring light on the surface of the detector after diffraction, which effectively guarantees that the interference contrast is consistently 100%, such that the signal-to-noise ratio of the system can be maintained at a relatively high level. Therefore, the interferometry device of the present invention is insensitive to the angle of rotation around the XYZ axes, and can maintain a high interference contrast in a certain range of angular changes, which not only enhances the stability of the system, but also effectively improve the quality of the signal. Given the above advantages, the structure of the present invention is very suitable for grating interferometry applications involving high integration level, small volume, and strict requirement on precision, and can be suitable for scenarios which have higher requirements on displacement measurement, such as high-end computer numerical control machine tools, and aeronautics and astronautics.

BRIEF DESCRIPTION OF DRAWINGS

The FIGURE is a structural schematic diagram of a Littrow grating interferometry device provided in an embodiment of the present invention.

The References Signs in the FIGURE Include:

light source 1, polarizing beam splitting prism 2, first quarter-wave plate 3, first reflective mirror 4, second reflective mirror 5, second quarter-wave plate 6, third reflective mirror 7, fourth reflective mirror 8, first diffraction grating 9, third quarter-wave plate 10, fifth reflective mirror 11, sixth reflective mirror 12, second diffraction grating 13, detector 14.

DETAILED DESCRIPTION OF THE EMBODIMENTS

Embodiments of the present invention will be described hereinafter with reference to accompanying drawings. In the following description, like modules are represented by the same reference sign. With the same reference sign, their name and function are also the same. Accordingly, detailed description thereof will not be repeated.

In order to make the purpose, technical solutions, and advantages of the present invention clearer, the present invention will be further explained in detail below in conjunction with the accompanying drawings and specific embodiments. It should be understood that the specific embodiments described herein are only intended to explain the present invention and do not constitute limitation to the present invention.

As shown in the FIGURE, an embodiment of the present invention provides a Littrow grating interferometry device, which is mainly composed of a light source 1, a polarizing beam splitting prism 2, a first quarter-wave plate 3, a reflection assembly, a second quarter-wave plate 6, a third reflective mirror 7, a fourth reflective mirror 8, a first diffraction grating 9, a third quarter-wave plate 10, a fifth reflective mirror 11, a sixth reflective mirror 12, a second diffraction grating 13, and a detector 14. A two-frequency laser is used as the light source 1. The output light of the two-frequency laser is composed of two beams of light having different frequencies and mutually perpendicular polarization states, the two beams of light being denoted as first measuring light and second measuring light. The frequency of the first measuring light is expressed as $f_1$, and the frequency of the second measuring light is expressed as $f_2$. The first measuring light is in a horizontal polarization state, and the second measuring light is in a vertical polarization state.

The polarizing beam splitting prism 2 is a cube structure formed by gluing two right-angle prisms along inclined planes thereof. The inclined planes are an optical surface which have particular polarization characteristics and a space angle of 45 degrees, and can split incident light into beams according to the polarization states thereof. The output light from the light source 1, after passing the polarizing beam splitting prism 2, will be split into first measuring light which is transmitted and second measuring light which is reflected.

The first diffraction grating 9 and the second diffraction grating 13 have identical optical parameters, and are both a reflection type diffraction grating. The first diffraction grating 9 and the second diffraction grating 13 are disposed on two sides of the polarizing beam splitting prism 2 in a vertical direction, respectively. The first diffraction grating 9 and the second diffraction grating 13 are parallel to each other, and are positioned to be opposite to each other. That is, the orthographic projection of the first diffraction grating 9 coincides with that of the second diffraction grating 13 in the vertical direction.

The reflection assembly is disposed on one side of the polarizing beam splitting prism 2 in a horizontal direction, and the light source 1 and the detector 14 are disposed on the other side of the polarizing beam splitting prism 2 in the horizontal direction. The reflection assembly is mainly used to reflect a light beam incident along the direction of the optical axis of the light source 1 to the detector 14 so as to facilitate collection of the final interference light by the detector 14. The reflection assembly needs to have two reflective surfaces which are perpendicular to each other, and the two reflective surfaces have a space angle of 45 degrees and 135 degrees, respectively. In this embodiment, the reflection assembly is composed of a first reflective mirror 4 and a second reflective mirror 5 which are independent of each other; as an alternative, a one-piece right-angle reflective mirror may be used instead of the first reflective mirror 4 and the second reflective mirror 5.

The first quarter-wave plate 3, the second quarter-wave plate 6, and the third quarter-wave plate 10 are all used to change the polarization direction of incident light, and can delay the phase of the incident light by one quarter of the wavelength. When the incident light passes through the quarter-wave plate in one round trip, the light with the horizontal polarization state can be changed into the light with the vertical polarization state, or the light with the vertical polarization state can be changed into the light with the horizontal polarization state. The first quarter-wave plate 3 is disposed between the reflection assembly and the polarizing beam splitting prism 2, the second quarter-wave plate 6 is disposed between the first diffraction grating 9 and the polarizing beam splitting prism 2, and the third quarter-wave plate 10 is disposed between the second diffraction grating 13 and the polarizing beam splitting prism 2. In addition, in order to ensure that the optical paths of the first measuring light and the second measuring light are stable during the process of undergoing secondary diffraction between the first diffraction grating 9 and the second diffraction grating 13, in an embodiment of the present invention, the third reflective mirror 7 and the fourth reflective mirror 8 are disposed between the second quarter-wave plate 6 and the first diffraction grating 9, and the fifth reflective mirror 11 and the sixth reflective mirror 12 are disposed between the third quarter-wave plate 10 and the second diffraction grating 13. The third reflective mirror 7, the fourth reflective mirror 8, the fifth reflective mirror 11 and the sixth reflective mirror 12 are all required to be configured in a manner such that the light incident on the first diffraction grating 9 or the second diffraction grating 13 from the reflective mirror is reflected along the original incident optical path.

On the basis of the above structure, the principle of displacement measurement of the Littrow grating interferometry device is as follows:

Firstly, the output light of the light source 1 is incident on the polarizing beam splitting prism 2, the first measuring light in the horizontal polarization state in the output light is transmitted through the polarizing beam splitting prism 2, and the second measuring light in the vertical polarization state in the output light is reflected by the polarizing beam splitting prism 2. The travel of the first measuring light and the second measuring light are described below, respectively:

The first measuring light, after being transmitted through the polarizing beam splitting prism 2, continues to travel through the first quarter-wave plate 3 and irradiates on the first reflective mirror 4. The first reflective mirror 4 reflects the first measuring light to the second reflective mirror 5, and the second reflective mirror 5 reflects the first measuring light so that it passes through the first quarter-wave plate 3 again. After the first measuring light in the horizontal polarization state passes through the first quarter-wave plate 3 in a round trip, its phase is changed by $\pi/2$. That is, at this time, the first measuring light is in the vertical polarization state. The first measuring light, after entering the polarizing beam splitting prism 2, is reflected by the polarizing beam splitting prism 2 to the second quarter-wave plate 6, and after passing through the second quarter-wave plate 6, irradiates on the third reflective mirror 7. The third reflective mirror 7 reflects the first measuring light to the first diffraction grating 9, and the first diffraction grating 9 diffracts the first measuring light for a first time and then reflects the diffracted first measuring light to the third reflective mirror 7 along the original incident optical path. The third reflective mirror 7 reflects the first measuring light also along the original incident optical path so that it passes through the second quarter-wave plate 6. At this time, the first measuring light has passed through the second quarter-wave plate 6 in a round trip, and with its phase being changed again by π/2, has reverted to the horizontal polarization state. The first measuring light is transmitted through the polarizing beam splitting prism 2, and then the first measuring light passes through the third quarter-wave plate 10 and irradiates on the fifth reflective mirror 11. The fifth reflective mirror 11 reflects the first measuring light to the second diffraction grating 13, and the second diffraction grating 13 diffracts the first measuring light for a second time and then reflects it to the fifth reflective mirror 11 along the original incident optical path. The fifth reflective mirror 11 reflects the first measuring light having been diffracted for a second time along the original incident optical path, so that it passes through the third quarter-wave plate 10. At this time, the first measuring light has passed through the third quarter-wave plate 10 in a round trip, and with its phase being changed again by π/2, has reverted to the vertical polarization state. Then, the first measuring light is reflected by the polarizing beam splitting prism 2 to the detector 14.

The second measuring light is reflected by the polarizing beam splitting prism 2 to the third quarter-wave plate 10, and the second measuring light passes through the third quarter-wave plate 10 and irradiates on the sixth reflective mirror 12. The sixth reflective mirror 12 reflects the second measuring light to the second diffraction grating 13, so that the second measuring light is diffracted for a first time. The second measuring light is reflected by the second diffraction grating 13 along the original optical path, and passes through the third quarter-wave plate 10 again. At this time, after the second measuring light in the vertical polarization state passes through the third quarter-wave plate 10 in a round trip, its phase is changed by π/2. That is, at this time, the second measuring light is in the horizontal polarization state. The second measuring light, after entering the polarizing beam splitting prism 2, is transmitted through the polarizing beam splitting prism 2 to the second quarter-wave plate 6, and after passing through the second quarter-wave plate 6, irradiates on the fourth reflective mirror 8. The fourth reflective mirror 8 reflects the second measuring light to the first diffraction grating 9, and the first diffraction grating 9 diffracts the second measuring light for a second time and then reflects the diffracted second measuring light to the fourth reflective mirror 8 along the original incident optical path. The fourth reflective mirror 8 reflects the second measuring light also along the original incident optical path so that it passes through the second quarter-wave plate 6. At this time, the second measuring light has passed through the second quarter-wave plate 6 in a round trip, and with its phase being changed again by π/2, has reverted to the vertical polarization state. The second measuring light, after entering the polarizing beam splitting prism 2, is reflected by it and passes through the first quarter-wave plate 3. The second measuring light continues to travel, and irradiations on the first reflective mirror 4. The first reflective mirror 4 reflects the second measuring light to the second reflective mirror 5, and the second reflective mirror 5 reflects the second measuring light so that it passes through the first quarter-wave plate 3. At this time, the second measuring light has passed through the first quarter-wave plate 3 in a round trip, and with its phase being changed by π/2 again, has reverted to the horizontal polarization state. The second measuring light in the horizontal state is transmitted through the polarizing beam splitting prism 2, and is incident on the detector 14. Now, both the second measuring light and the first measuring light have undergone diffraction twice, and are incident on the detector 14 along the same optical path. The second measuring light and the first measuring light combine and interfere with each other, and the detector 14 can collect the interference pattern of the two beams of measuring light. Grating displacement can be calculated by analyzing the interference pattern.

In the Littrow grating interferometry device of the present invention, two diffraction gratings disposed opposite to each other are adopted, so that secondary diffraction under Littrow incidence is achieved, and the multiple of optical subdivision is improved. Moreover, the first diffraction grating 9 and the second diffraction grating 13 are positioned fixed relative to each other, and are insensitive to the angle of rotation around the XYZ axes. The measurement error caused by angular rotation can be greatly restrained.

The Littrow grating interferometry device in an embodiment of the present invention can be applied to a displacement measurement scenario of high measurement precision. The specific steps are as follows:

S1: Firstly, during use, the first diffraction grating 9 and the second diffraction grating 13 as the measuring gratings are strictly aligned opposite to each other and fixedly mounted so as to avoid the occurrence of an error in angle resulting from rotation of a middle measuring portion. In the embodiment of the present invention, the design of two diffraction gratings positioned opposite to each other can allow the first measuring light and the second measuring light to maintain good light spot coincidence.

The complex amplitudes of the first measuring light and the second measuring light in the output light are obtained according to parameters of the light source 1. The complex amplitudes of the first measuring light and the second measuring light can be expressed as:

$$E_{f_1} = E_0 \cdot e^{i(-2\pi f_1 \cdot t + \varphi_0)};$$

$$E_{f_2} = E_0 \cdot e^{i(-2\pi f_2 \cdot t + \varphi_0')};$$

where, $f_1$ represents the frequency of the first measuring light, $f_2$ represents the frequency of the second measuring light, $E_0$ represents the amplitude of the orthogonal linear polarized light of the first measuring light and the second measuring light, i.e. the amplitude of the output light, t represents time, $E_{f_1}$ represents the complex amplitude of the first measuring light as it radiates from the light source 1, $E_{f_2}$ represents the complex amplitude of the second measuring light as it radiates from the light source 1, $\varphi_0$ represents the phase of the first measuring light as it radiates from the light source 1, and $\varphi_0'$ represents the phase of the second measuring light as it radiates from the light source 1.

S2: The interference pattern collected by the detector 14 is analyzed, and the complex amplitudes of the first measuring light and the second measuring light collected by the detector 14 are expressed as:

$$E'_{f_1} = E_0 \cdot e^{i(-2\pi f_1 \cdot t + \varphi_0 + 2\varphi_1)};$$

$$E'_{f_2} = E_0 \cdot e^{i(-2\pi f_2 \cdot t + \varphi_0' + 2\varphi_2)};$$

where, $E_{f_1}'$ represents the complex amplitude of the first measuring light collected by the detector 14, $E_{f_2}'$ represents the complex amplitude of the second measuring light collected by the detector 14, $\varphi_1$ represents the quantity of change in the phase of the first measuring light resulting from grating displacement, and $\varphi_2$ represents the quantity of change in the phase of the second measuring light resulting from grating displacement;

thus the expression of light intensity after the first measuring light and the second measuring light interfere with each other is:

$$I = \left|E'_{f_1} + E'_{f_2}\right|^2 \propto \cos(2\pi\Delta\mathrm{ft} + \Delta\varphi + 2\varphi_1 - 2\varphi_2).$$

S3: In the Littrow grating interferometry device, the distance between the first diffraction grating 9 and the second diffraction grating 13 is d. Suppose that during the process of grating displacement measurement, as the first diffraction grating 9 and the second diffraction grating 13 move at a certain velocity v along the grating vector direction, after the first measuring light and the second measuring light interfere with each other, m-order diffracted light will produce a Doppler frequency shift. The general expression of the Doppler frequency shift is:

$$\Delta f_d = -\frac{m \cdot v}{d};$$

where, $\Delta f_d$ represents the Doppler frequency shift of the diffracted light (that is, the first measuring light and the second measuring light having been diffracted), i.e., the difference between the frequency of the diffracted light collected by the detector 14 and the original frequency of the output light from the light source 1.

On the basis of the general expression of the Doppler frequency shift, the formula for calculating the change in the phase of the diffracted light resulting from grating displacement in the vector direction can be obtained as follows:

$$\varphi = 2\pi \cdot \int_0^t \Delta f_d dt = -\frac{4\pi m \cdot S}{d}.$$

According to the above formula, the quantity of change in the phase of the first measuring light and the quantity of change in the phase of the second measuring light resulting from displacement can be calculated as follows:

$$\begin{cases} \varphi_1 = \frac{4\pi m \cdot S}{d} \\ \varphi_2 = -\frac{4\pi m \cdot S}{d} \end{cases};$$

where, m represents the mth-order diffracted light, and S represents the displacement of the first diffraction grating and the second diffraction grating.

Thus, the formula for calculating the displacement of the first diffraction grating and the second diffraction grating can be obtained as follows:

$$S = \frac{d \cdot (\varphi_1 - \varphi_2)}{8\pi m}.$$

When the change in the phase is $2\pi$ according to the interference information acquired by the detector 14, the displacement of the grating is $$S = \frac{d}{4m}.$$

The Littrow grating interferometry device proposed in the embodiment of the present invention can achieve optical subdivision of 4 m times under Littrow incidence.

Although the embodiments of the present invention have been shown and described above, it should be understood that the above embodiments are exemplary and should not be construed as limiting the present invention. Those of ordinary skill in the art can make changes, modifications, substitutions, and variations to the above embodiments within the scope of the present invention.

The above specific embodiments of the present invention do not constitute limitation on the scope of protection of the present invention. Any other corresponding changes and modifications made according to the technical concept of the present invention shall be encompassed within the scope of protection of the claims of the present invention.

What is claimed is:

1. A Littrow grating interferometry device, characterized by comprising:

a light source, a polarizing beam splitting prism, a reflection assembly, a detector, and a first diffraction grating and a second diffraction grating having identical parameters;

wherein, output light of the light source is composed of first measuring light and second measuring light having different frequencies and mutually perpendicular polarization states, the first diffraction grating and the second diffraction grating are parallel to each other and are positioned to be opposite to each other on two sides of the polarizing beam splitting prism, and both the first diffraction grating and the second diffraction grating reflect diffracted light along an original incident optical path; of other two sides of the polarizing beam splitting prism, the reflection assembly is disposed on one side, and the light source and the detector are disposed on the other side; a first quarter-wave plate is disposed between the reflection assembly and the polarizing beam splitting prism; a second quarter-wave plate is disposed between the first diffraction grating and the polarizing beam splitting prism; a third quarter-wave plate is disposed between the second diffraction grating and the polarizing beam splitting prism; and the polarizing beam splitting prism is used to separate the first measuring light and the second measuring light, such that light in a horizontal polarization state is transmitted and light in a vertical polarization state is reflected; the reflection assembly is used to reflect incident light to the detector.

2. The Littrow grating interferometry device according to claim 1, characterized in that reflective mirrors used to reflect diffracted light, which is obtained after diffraction by the first diffraction grating, along the original incident optical path are disposed between the first diffraction grating and the second quarter-wave plate; and reflective mirrors used to reflect diffracted light, which is obtained after diffraction by the second diffraction grating, along the original incident optical path are disposed between the second diffraction grating and the third quarter-wave plate.

3. The Littrow grating interferometry device according to claim 1, characterized in that the reflection assembly comprises two reflective mirrors which are angularly positioned perpendicular to each other.

4. A use of the Littrow grating interferometry device, characterized in that the use of the Littrow grating interferometry device according to claim 1 in performing displacement measurement comprises the following steps:
acquiring complex amplitudes of the first measuring light and the second measuring light in the output light of the light source;
acquiring complex amplitudes of the first measuring light and the second measuring light collected by the detector; and
obtaining quantity of change in phase of the first measuring light and the quantity of change in phase of the second measuring light resulting from displacement of the first diffraction grating and the second diffraction grating by performing calculation based on a Doppler frequency shift effect produced by m-order diffracted light, and obtaining the displacement of the first diffraction grating and the second diffraction grating by performing calculation according to a difference between the quantity of change in the phase of the first measuring light and the quantity of change in the phase of the second measuring light.

5. The use of the Littrow grating interferometry device according to claim 4, characterized in that the complex amplitudes of the first measuring light and the second measuring light in the output light of the light source are expressed as:

$$E_{f_1} = E_0 \cdot e^{i(-2\pi f_1 \cdot t + \varphi_0)};$$

$$E_{f_2} = E_0 \cdot e^{i(-2\pi f_2 \cdot t + \varphi_0')};$$

where, $f_1$ represents the frequency of the first measuring light, $f_2$ represents the frequency of the second measuring light, $E_0$ represents the amplitude of the orthogonal linear polarized light of the first measuring light and the second measuring light, t represents time, $E_{f_1}$ represents the complex amplitude of the first measuring light as it radiates from the light source, $E_{f_2}$ represents the complex amplitude of the second measuring light as it radiates from the light source, $\varphi_0$ represents the phase of the first measuring light as it radiates from the light source, and $\varphi_0'$ represents the phase of the second measuring light as it radiates from the light source.

6. The use of the Littrow grating interferometry device according to claim 5, characterized in that the complex amplitudes of the first measuring light and the second measuring light collected by the detector are expressed as:

$$E'_{f_1} = E_0 \cdot e^{i(-2\pi f_1 \cdot t + \varphi_0 + 2\varphi_1)};$$

$$E'_{f_2} = E_0 \cdot e^{i(-2\pi f_2 \cdot t + \varphi_0' + 2\varphi_2)};$$

where, $E_{f_1}'$ represents the complex amplitude of the first measuring light collected by the detector, $E_{f_2}'$ represents the complex amplitude of the second measuring light collected by the detector, $\varphi_1$ represents the quantity of change in the phase of the first measuring light resulting from displacement, and $\varphi_2$ represents the quantity of change in the phase of the second measuring light resulting from displacement.

7. The use of the Littrow grating interferometry device according to claim 6, characterized in that the quantity of change in the phase of the first measuring light and the quantity of change in the phase of the second measuring light resulting from displacement obtained based on the Doppler frequency shift effect produced by m-order diffracted light are as follows:

$$\begin{cases} \varphi_1 = \dfrac{4\pi m \cdot S}{d} \\ \varphi_2 = -\dfrac{4\pi m \cdot S}{d} \end{cases};$$

where, m represents the mth-order diffracted light, d represents the distance between the first diffraction grating and the second diffraction grating, and S represents the displacement of the first diffraction grating and the second diffraction grating;

thus, the formula for calculating the displacement of the first diffraction grating and the second diffraction grating is as follows:

$$S = \frac{d \cdot (\varphi_1 - \varphi_2)}{8\pi m}.$$

\* \* \* \* \*